United States Patent
Kasahara et al.

[19]

[11] Patent Number: 5,920,738
[45] Date of Patent: Jul. 6, 1999

[54] CAMERA EMPLOYING FILM WITH MAGNETIC RECORDING SECTION

[75] Inventors: Hideyuki Kasahara; Tokuo Shimizu, both of Hachioji; Toru Komatsu, Okaya, all of Japan

[73] Assignee: Olympus Optical Co., Ltd., Tokyo, Japan

[21] Appl. No.: 08/966,718

[22] Filed: Nov. 10, 1997

[30] Foreign Application Priority Data

Nov. 13, 1996 [JP] Japan ..................................... 8-302154
Nov. 20, 1996 [JP] Japan ..................................... 8-309689

[51] Int. Cl.⁶ .................................................. G03B 17/24
[52] U.S. Cl. .............................................................. 396/319
[58] Field of Search ..................................... 396/310–312, 396/319, 320

[56] References Cited

U.S. PATENT DOCUMENTS

| | | | |
|---|---|---|---|
| 4,796,135 | 1/1989 | Oishi | 360/130.33 |
| 5,184,268 | 2/1993 | Mizuno et al. | 360/132 |
| 5,253,135 | 10/1993 | Hamana | 360/130.21 |
| 5,477,290 | 12/1995 | Takeshita | 396/319 |
| 5,510,864 | 4/1996 | Hills et al. | 396/319 |

FOREIGN PATENT DOCUMENTS

| | | |
|---|---|---|
| 3-168624 | 7/1991 | Japan . |
| 4-11237 | 1/1992 | Japan . |
| 6-282006 | 10/1994 | Japan . |

*Primary Examiner*—David M. Gray
*Attorney, Agent, or Firm*—Louis Weinstein

[57] ABSTRACT

A camera employing a film with a magnetic recording section and comprising a magnetic head with a magnetic gap portion for magnetically recording or reading (reproducing) information and a pressing member for pressing a surface of the film against the magnetic head. The pressing member has a film contact surface side cross section of a substantially U-like configuration in a film traveling direction. Two high portions defined at both sides of this U-like configuration are formed to be different in protruding length from each other.

14 Claims, 9 Drawing Sheets

CAMERA EMPLOYING FILM WITH MAGNETIC RECORDING SECTION

BACKGROUND OF THE INVENTION

1. Field of the Invention

The present invention relates to a camera employing a film with a magnetic recording section, and more particularly to a camera using a film with a magnetic recording section, with the camera being equipped with a magnetic head having a magnetic gap portion for recording or reading (reproducing) information and further equipped with a pressure pad (pressing member) for pressing the magnetic recording section (film surface) of the film against the magnetic head.

2. Related Background Art

Recently, the so-called films with a magnetic recording section have variously been proposed as roll films taken for photography and actually put to practical use, wherein a magnetic recording section is placed on a film surface for allowing the magnetic recording of information. In addition, cameras employing the film with the magnetic recording section have also been proposed in various ways.

Such cameras employing a film with a magnetic recording section are equipped with a magnetic head with a magnetic gap whereby information is recorded on the magnetic recording section of the film or information recorded is read out (reproduced) therefrom, that is, this magnetic head accomplishes the magnetic recording and reading of information. Further, in general a pressure pad (pressing member) is provided to press the magnetic recording section against the magnetic head, thereby ensuring the information is recorded and read by the magnetic head.

More specifically, for making sure the magnetic recording and reading of information by the magnetic head, it is necessary for the magnetic gap portion of the magnetic head to be correctly brought into contact with the magnetic recording section of the film. For this reason, in the prior art, a pressure pad (pressing member) is pressed against the magnetic head through the use of a biasing member or the like, or as will be described later, both the magnetic head and pressure pad respectively have biasing members so as to be pressed against each other, so that the film is caught in between the magnetic head and the pressure pad to allow the film magnetic recording section to be correctly placed into contact with the magnetic gap portion of the magnetic head.

Furthermore, for ensuring the appropriate contact of the magnetic gap portion of the magnetic head with the magnetic recording section of the film, commonly the surface of the magnetic head having the magnetic gap portion, i.e., the contact surface with the film, is shaped into an arc configuration.

That is, in a magnetic recording apparatus applicable to the prior cameras, as shown in FIG. 17, a magnetic head 101 with a magnetic gap portion 101a is located on the rear side of the camera, i.e., on the side of a pressure plate 106 placed for keeping the flatness of the film surfaces in a state where a biasing member 104b is interposed between the magnetic head 101 and the pressure plate 106, while a pressure pad 103 is situated on the side of a camera body 105 in a state where a biasing member 104a is sandwiched between the pressure pad 103 and the camera body 105, with the pressure pad 103 being positioned in opposed relation to the magnetic head 101 so that a film feeding passage in which a film 102 set in the camera travels is defined between the magnetic head 101 and the pressure pad 103. Further, the magnetic head 101 and the pressure pad 103 are biased to press against each other by the biasing forces of the biasing members 104a, 104b to hold the film 102 therebetween.

Still further, for ensuring the magnetic recording and reading by the magnetic head 101, the surface of the magnetic head 101 which has the magnetic gap portion 101a is made to have an arc configuration with respect to a plane in the film traveling direction (the arrow X direction in FIG. 17) so that the magnetic gap portion 101a can appropriately be brought into contact with the magnetic recording section of the film 102 and the contact between the magnetic gap portion 101a and the film 102 becomes facilitated.

A description will be made hereinbelow of the disposition of a magnetic head and a pressing member organizing a magnetic recording apparatus in a prior camera employing a film with a magnetic recording section, which has been proposed and put to practical use.

That is, as shown in FIG. 18, in the afore said prior camera, a magnetic head 101 with a magnetic gap portion 101a is fixedly secured to a stationary member on the rear side of the camera, whereas a pressing member 103 is placed on the side of a camera body 105 to be in opposed relation to the magnetic head 101 so that a film 102 is interposed therebetween, with a biasing member 104a being put in between the pressing member 103 and the camera body 105. Thus, the film 102 is sandwiched between the magnetic head 101 and the pressing member 103 and the pressing member 103 is biased by the biasing force of the biasing member 104a in the direction of being pressed against the magnetic head 101 side.

In addition, for making sure the magnetic recording and reading by the magnetic head 101, the surface of the magnetic head 101 having the magnetic gap portion 101a, i.e., the film contact surface, is made to have an arc configuration with respect to a plane in the film traveling direction (the arrow X direction in FIG. 18) so that the magnetic gap portion 101a can correctly be brought into contact with the magnetic recording section of the film 102 and the contact between the magnetic gap portion 101a and the film 102 becomes easy.

Furthermore, for the correct contact of the magnetic head in the camera with the magnetic recording section of the film to ensure the magnetic recording and reading, through the use of the biasing force of the biasing member the pressing member is made to be biased toward the magnetic gap portion of the magnetic head in a state where the film is put in therebetween. For example, there are an apparatus employing the so-called swinging type pressing member as shown in FIG. 19 and an apparatus in which a plate spring is used as the biasing member for pushing the pressing member against the magnetic head side as shown in FIG. 20.

In the apparatus employing the swinging type pressing member, as shown in FIG. 19 a step portion 103A is formed at a proximal section of a pressing member 103a and a shaft portion 103 is planted and one end portion of a biasing member 104 comprising an extensible coil spring is fixedly secured to the step portion 103A. Further, the other end portion of the same biasing member 104 is brought into contact with a stationary member on the camera body 105 side so that the pressing member 103 is vertically biased toward the magnetic head 101 side by means of the biasing force of the biasing member 104 in a state where a film 102 is interposed therebetween. The tip portion 103c of the shaft portion 103 is engaged with a recess portion 103B on the camera body 105 side, with the result that the pressing member 103a is always situated at the position facing the magnetic gap portion 101a of the magnetic head 101.

In this case, the engagement between the step portion 103A of the pressing member 103a and the camera body 105 and the engagement between the shaft portion 103c and the recess portion 103B on the camera body 105 side are not made in a state where they come closely into contact with each other. Accordingly, when the magnetic head 101 and the pressing member 103a are pressed against each other in a state where the film 102 is put therebetween, on the feed of the film the pressing member 103a follows the film 102 to swing in the film feeding direction.

More specifically, engagement looseness slightly occurs in the engaging portion between the step portion 103A and the camera body 105 and between the shaft portion 103c and the recess portion 103B on the camera body 105 side. Owing to the presence of this engagement looseness, when the film 102 is fed in the direction indicated by an arrow X in FIG. 19, a friction F occurs between the film contact surface of the pressing member 103a and the film 102, thereby swinging the pressing member 103.

On the other hand, in the case of the apparatus employing a plate spring as the biasing member, as shown in FIG. 20 a pressing member 103b is fitted to the free end portion of a plate spring 104A serving as the biasing member whose proximal portion is cantilevered by a supporting pin 106 on a camera body 105, and this pressing member 103b is biased toward a magnetic gap portion 101a of a magnetic head 101 by means of the biasing force of the plate spring 104A.

In addition, means for correctly bringing a magnetic head in a camera into contact with a magnetic recording section on a film surface to secure the magnetic recording and reading has been proposed, for example, through Japanese Unexamined Patent Publication No. 3-168624. In the camera disclosed in Japanese Unexamined Patent Publication No. 3-168624, a magnetic head and a pressing member (pressure pad) are located to be in opposed relation to each other in a state in which a film is put therebetween, and the magnetic head is biased by a biasing member comprising an extensible spring while the pressing member is biased by a biasing member comprising a plate spring so that they are pressed against each other to hold the magnetic recording section of the film, thereby improving the contact condition between the magnetic head and the film and minimizing the adverse influence on the photographed scene due to the distortion or deformation of the film.

In the case of the apparatus equipped with the film contact surface of the magnetic head having an arc configuration as shown in FIG. 18 or disclosed in Japanese Unexamined Patent Publication No. 3-168624, as shown in FIG. 21 there is a possibility that a magnetic gap portion 101a of a magnetic head 101 is assembled in a state of being inclined by an angle α with respect to a surface of a film 102 due to the dimensional errors and fitting errors of the components or the like. In FIG. 21, an arrow X represents the film feeding direction.

In this case, it is difficult that the magnetic gap portion 101a correctly comes into contact with the magnetic recording section of the film 102, with the result that difficulty is encountered to surely perform the magnetic recording and reading.

Thus, a technical means to solve such a problem is exemplified by Japanese Unexamined Patent Publication No. 4-11237.

In a camera disclosed in Japanese Unexamined Patent Publication No. 4-11237, there are provided a magnetic head and a pressing member for pressing a film surface against the magnetic head side through the biasing force of a biasing member. Further, a pressure pad is placed to be swingable in the film traveling direction and the film contact surface of the pressure pad is made to have a U-like cross-sectional configuration, so that, even if a trouble about the fitting positions of the magnetic head and the pressure pad occurs due to the dimensional errors and fitting errors of the respective components, the magnetic head and the magnetic recording section of the film can stably come into contact with each other.

Furthermore, in a camera disclosed in Japanese Unexamined Patent Publication No. 6-282006, a magnetic head is disposed to be inclined by a given angle with respect to the film traveling direction so that its magnetic gap portion substantially vertically comes into contact with a magnetic recording section of a film.

With this structure, the contact condition of the magnetic gap portion with respect to the film magnetic recording section is improvable and the flatness of the film is also improvable.

On the other hand, in the case of the swinging type pressing member 103 mentioned referring to FIG. 19, when the film 102 is not loaded yet in the camera, it is biased in the direction perpendicular to the magnetic head 101. However, if the film 102 is loaded therein and fed, the pressing member 103 follows the film 102 to swing in the film feeding direction, with the result that the pressing member 103 is inclined by an angle θ as shown in FIG. 19.

Accordingly, difficulty is experienced to ensure the correct contact between the magnetic gap portion 101a of the magnetic head 101 and the magnetic recording section of the film 102, thus resulting in unsatisfactory magnetic recording and reading.

Still further, in the case of employing the pressing member using a plate spring mentioned with reference to FIG. 20, in a state where the film 102 is not loaded in the camera, the magnetic head 101 and the pressing member 103b are disposed to face each other in parallel. On the contrary, if the film 102 is loaded in the camera and fed, as shown in FIG. 22 the film 102 is put between the magnetic head 101 and the pressing member 103, and in this case, the pressing member 103b is pushed down against the biasing force of the plate spring 104A.

More specifically, the pressing member 103b, together with the plate spring 104A, is rotated clockwise in FIG. 22 in a manner that the supporting pin 106 serves as a supporting shaft. Whereupon, the pressing member 103b takes a condition inclined by an angle β with respect to the magnetic gap portion 101a.

For this reason, the correct control becomes impossible between the magnetic gap portion 101a of the magnetic head 101 and the magnetic recording section of the film 102, and as in the case of the aforesaid swinging type pressing member, difficulty is encountered to certainly accomplish the magnetic recording and reading.

Moreover, in the case of the means shown in FIG. 18 or disclosed in Japanese Unexamined Patent Publication No. 3-168624, if as described with reference to FIG. 21 the magnetic gap portion 101a of the magnetic head 101 is assembled in a state of being inclined with respect to the film 102 surface due to the dimensional errors and fitting errors of the components or the like, the magnetic gap portion 101a can not correctly be placed into contact with the magnetic recording section of the film 102, which makes difficult to ensure magnetic recording and reading.

Accordingly, for preventing the magnetic recording section of the film 102 from rising from the magnetic gap portion 101a, it is considered that, for example, the biasing members 104a working for the magnetic head 101 and the pressing member 103 is set to have a stronger biasing force.

However, since the film 102 is fed in a state of being placed between the magnetic head 101 and the pressing member 103, if the biasing force of the biasing member 104a increases, the load on the film 102 during the feeding becomes larger so that not only the consumption of the power battery increases but also it is impossible to perform the film feeding at a constant speed, with the result that the magnetic recording and reading to be done during the film feeding becomes difficult.

In addition, in the case of strengthening the biasing force of the biasing member 104a, the film contact surface of the magnetic head 101 can damage or destroy the film 102.

Moreover, in the camera disclosed in Japanese Unexamined Patent Publication No. 4-11237, if as shown in FIG. 23 a magnetic gap portion 101a and the swinging center 107 of a pressing member 103d are assembled in a state of being shifted by a distance indicated by character A from a given position, the pressing member 103d is inclined by an angle γ. Accordingly, in this case, in a state where a film 102 is not mounted in the camera, it is impossible to ensure a satisfactory separation between the magnetic head 101 and the pressing member 103d.

For this reason, in this state, when the film 102 is loaded in the camera and fed (the feeding direction is the direction indicated by an arrow X in FIG. 23), the tip portion of the film 102 can not pass through the separation between the magnetic head 101 and the pressing member 103d, so that the film 102 stops.

Accordingly, in order to avoid the stopping of the film 102 in this state, there is a need for a mechanism which moves at least one of the pressing member 103 and the magnetic head 101 to enlarge the separation between the magnetic head 101 and the pressing member 103d. However, if employing such a mechanism, the camera itself increases in size and the manufacturing cost increases.

On the other hand, like the means shown in FIG. 17 or disclosed in Japanese Unexamined Patent Publication No. 3-168624 or 4-11237, in the case that the magnetic head and the pressure pad are constructed to be pressed against each other by the biasing forces of the biasing members, the pressure pad is always pressed against the film surface by the biasing member even while the film travels for feeding. Accordingly, as the camera is more frequently used for photography, more abrasion occurs because the film surface travels while being brought into contact with the pressure pad. Whereupon, the contact condition between the magnetic gap portion of the magnetic head and the magnetic recording section on the film surface varies from the initial state, and the continuous use makes it difficult to secure the magnetic recording and reading of information.

Furthermore, as described above, when the contact surface of the pressure pad wears out by the film surface, powder is produced due to the abrasion of the pressure pad, and if this abrasion powder attaches to the magnetic gap portion of the magnetic head, the abrasion powder hinders the contact between the magnetic recording section on the film surface and the magnetic gap portion, which makes it difficult to surely accomplish the magnetic recording and reading of information.

Still further, when the film feeding operation is conducted in a state where the film surface and the pressure pad are placed into contact with each other, in the case of a common pressure pad, static electricity occurs because of the sliding contact between the film surface and the pressure pad, so that the abrasion powder tends to be absorbed by the film surface. In addition, in a state where the film is not loaded in the camera, the magnetic head and the pressure pad are placed into direct contact with each other, with the result that the abrasion powder absorbed by the pressure pad can be transferred from the pressure pad side to the magnetic head side due to static elasticity. If in this state the film is loaded in the camera, as described above, the abrasion powder hinders the contact between the magnetic recording section of the film and the magnetic gap portion, thereby making it difficult to certainly perform magnetic recording and reading.

Moreover, if static electricity occurs between the film surface and the pressure pad due to the film feeding, the discharge of this static electricity can make the emulsion surface of a non-exposed section of the film partially exposed, that is, the camera can suffer from troubles such as the so-called color fog.

SUMMARY OF THE INVENTION

Accordingly, it is a first object of the present invention to provide a magnetic recording apparatus for use in a camera for taking a photograph using a film with a magnetic recording section, which includes a magnetic head with a magnetic gap portion for magnetically recording and reading (reproducing) information in and from the magnetic recording section on the film and a pressure pad for pressing the magnetic recording section of the film against the magnetic head and which is capable of suppressing abrasion of the pressure pad, generation of static electricity; and others occurring at the film feeding operation to ensure certain magnetic recording and reading.

A second object of this invention is to provide a camera employing a film with a magnetic recording section which is capable of, in magnetically recording and reading information on and from the magnetic recording section of the film, correctly bringing a magnetic gap portion of a magnetic head and the magnetic recording section of the film into contact with each other to ensure stable magnetic recording and reading and certain film feeding.

In brief, in accordance with the present invention, in a camera which comprises a magnetic head with a magnetic gap portion for magnetic recording and reading (reproduction) of information and a pressing member for pressing a film surface against the magnetic head and which uses a film with a magnetic recording section, a film contact surface side cross section of the pressing member in a film traveling direction has a substantially U-like configuration and two high portions are formed at both sides of the U-like configuration to be different in projecting quantity from each other.

These objects, other objects and advantages of the present invention will become more readily apparent from the following detailed description of the preferred embodiments taken in conjunction with the accompanying drawings.

According to this invention, it is possible to provide a magnetic recording apparatus for use in a camera which is capable of suppressing abrasion of the pressure pad and generation of static electricity occurring due to the sliding between the film surface and the pressure pad at a film feeding operation, thereby surely accomplishing magnetic recording and reading.

In addition, this invention can provide a camera using as film with a magnetic recording section which is capable of correctly bringing the magnetic gap portion of the magnetic head and the magnetic recording section of the film into contact with each other in magnetically recording and reading information on and from the magnetic recording section of the film, thus not only ensuring the stable magnetic recording and reading but also certainly feeding the film.

DETAILED DESCRIPTION OF THE PREFERRED EMBODIMENTS

Figure 1:
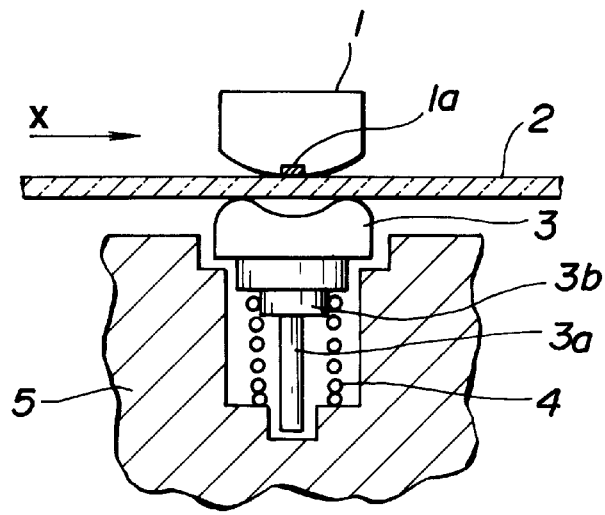
FIG. 1 is a schematic illustration of a structure of a magnetic recording apparatus for use in a camera according to a first embodiment of the present invention.
Figure 2:
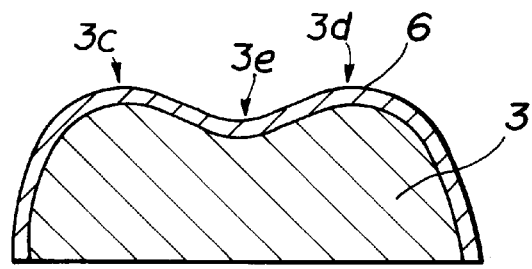
FIG. 2 is an enlarged cross-sectional view of a principal portion, showing only a pressure pad in the FIG. 1 magnetic recording apparatus.

FIG. 1 is a schematic illustration of a structure of a magnetic recording apparatus for use in a camera according to a first embodiment of the present invention, and FIG. 2 is an enlarged cross-sectional view of a principal portion, showing only a pressure pad in the FIG. 1 magnetic recording apparatus.

As shown in FIG. 1, the magnetic recording apparatus for a camera according to the first embodiment is composed of a magnetic head with a magnetic gap portion 1a for magnetically recording and reading information, a pressure pad 3 for pressing a magnetic recording section of a film 2 against the magnetic head 1, a biasing member 4 for biasing the pressure pad 3 toward the magnetic head 1 side, and other components, which are housed within a camera body 5. The film 2 is positioned between the magnetic head 1 and the pressure pad 3. In this case, the traveling direction of this film 2 takes a direction indicated by an arrow X in FIG. 1, and the pressure pad 3 itself is produced by pattern formation of a material such as a polycarbonate resin and a polyacetal resin with lubricity, or made from a stainless steel.

The magnetic head 1 is fixedly secured to a stationary member (not shown) located on the rear side of the camera body 5. A contact surface of this magnetic head 1 with the film 2 is made to have an arc configuration, and the top portion of this arc configuration is provided with the aforesaid magnetic gap portion 1a. Further, this magnetic gap portion 1a is disposed to face the interior of a film feeding passage of the camera body 5 in which the film 2 travels, and the magnetic gap portion 1a is positioned to be allowed to come into contact with the magnetic recording section of the film traveling within the film feeding passage.

In addition, as mentioned before, within the camera body 5 the pressure pad 3 is placed to be in opposed relation to the magnetic head 1. This pressure pad 3 has a step portion 3b at its proximal section, and a shaft portion 3a is planted therein. To this step portion 3b there is fixed one end portion of the biasing member 4 comprising an extensible coil spring, with the other end portion of the biasing member 4 being placed into contact with the camera body 5 side stationary member. Whereupon, the pressure pad 3 receives the biasing force of the biasing member 4 to be biased toward the magnetic head 1 side. Further, the tip of the shaft portion 3a is in engagement with a recess portion on the camera body 5 side, so that the pressure pad 3 is always positioned to face the magnetic gap portion 1a of the magnetic head 1.

Furthermore, as shown in the enlarged illustration of FIG. 2, the cross-sectional configuration of the pressure pad 3 has two consecutive high (projection) portions 3c and 3d to define a low (dent) portion 3c therebetween. The low portion 3c between the two high portions has a shape conforming with the aforesaid arc configuration of the magnetic head. Accordingly, when the pressure pad 3 is pressed against the magnetic head 1 side in a state where the film 2 is interposed therebetween, the low portion 3c defined between the two high portions comes into contact with the arc configuration of the magnetic head 1, thereby positioning the pressure pad 3 in the film traveling direction.

Still further, at least the pressure side surface of the pressure pad 3 to be pressed toward the film 2 side is coated with a material, such as an ultraviolet-curing resin 6, capable of improving the surface hardness and of suppressing the generation of static electricity. Concretely, an UV coating (the trade name: ULTRAVIN No. UV70, manufactured by Musashi Painting Co., Ltd.) is suitable as the ultraviolet-curing resin 6.

The surface hardness of the ultraviolet-curing resin 6 coated on the film pressure surface of the pressure pad 3 is set to show a satisfactory value, and more particularly, set to above 2H (according to a test method meeting the JIS K5400 standard).

Secondly, a brief description will be made hereinbelow of an operation of the magnetic recording apparatus for a camera thus constructed according to the first embodiment.

First, when the film 2 is fed into the film feeding passage within the camera body 5, the tip portion of the film 2 gets between the magnetic head 1 and the pressure pad 3. In a state where the film 2 is not loaded in the camera, the pressure pad 3 is pushed toward the magnetic 1 side by means of the biasing force of the biasing member 4, so that the pressure pad 3 and the magnetic head 1 are in the contact condition with each other. In this contact state, since the contact surface of the magnetic head 1 with (against) the film 2 has the arc configuration and the contact surface of the pressure pad 3 with the film 2 also has projecting configurations, a gap is defined between the magnetic gap portion 1a of the magnetic head 1 and the low portion of the pressure pad 3. Accordingly, the film is fed and the tip portion of the film 2 gets in this gap, and if the film 2 is further moved in the film traveling direction (the arrow X direction in FIG. 1), due to the film 2 the pressure pad 3 is pushed down against the biasing force of the biasing member 4. Consequently, the film 2 is put between the magnetic head 1 and the pressure pad 3.

Furthermore, in this state, the magnetic gap portion 1a of the magnetic head 1 is correctly pressed by the pressing force of the pressure pad 3 against the magnetic recording section of the film 2, so that the magnetic recording and reading of information can certainly be done according to the film feeding operation.

As described above, according to the first embodiment, the contact surface of the magnetic head 1 with the film 2 is formed to have an arc configuration and the contact surface of the pressure pad 3 with the film 2 is formed to have two high portions, and hence, the tip portion of the film 2 can smoothly be put between the magnetic head 1 and the pressure pad 3 according to the film feeding operation. Therefore, for example, it is possible to prevent the film 2 from being retained within the film feeding passage without being fed.

In addition, since the cross-sectional configuration of the pressure pad 3 is made to conform with the arc configuration of the magnetic head 1, that is, made to have two consecutive high portions, when the pressure pad 3 is biased by the biasing force of the biasing member 4 toward the magnetic head 1 side in a state where the film 2 is put therebetween, the pressure pad 3 comes into the positioned condition and the pressure pad 3 is surely pressed against the magnetic head 1 side in a state where the film 2 is put therebetween. Consequently, the magnetic gap portion 1a of the magnetic head 1 can appropriately be placed into contact with the magnetic recording section of the film 2, which leads to the certain magnetic recording and reading of information.

Still further, since at least the pressure side surface of the pressure pad 3 to be pressed toward the film 2 side is coated with the ultraviolet-curing resin 6, as compared with the surface hardness (the pencil scratch value assumes approximately AH@ under a test conforming with the JIS K5400 standard), it is possible to ensure a sufficient hardness (the pencil scratch value assumes approximately A2H@ under a test conforming with the JIS K5400 standard), and further to lower the coefficient of friction. Accordingly, the abrasion of the surface of the pressure pad 3 resulting from the sliding friction between the pressure pad 3 and the film 2 is suppressible and further the generation of the abrasion powder due to the abrasion of the surface configuration of the pressure pad 3 is suppressible, with the result that it is possible to eliminate the possibility of hindering the contact between the magnetic gap portion 1a of the magnetic head 1 and the film 2, thus accomplishing more stable magnetic recording and reading.

Moreover, since owing to the coating of the ultraviolet-curing resin 6 the coefficient of friction of the pressure pad 3 is set to be lower as mentioned above, the pressure pad 3 can smoothly slide relative to the film 2, which allows the suppression of the generation of static electricity between the film 2 and the pressure pad 3. Consequently, it is possible to prevent dust or the like from being attached to the pressure pad 3 and the magnetic gap portion 1a of the magnetic head 1 because of the static electricity, and hence, the more stable magnetic recording and reading becomes possible. In addition, it is possible to prevent the emulsion surface of a non-exposed section of the film from being partially exposed due to the discharge of this static electricity, that is, it is possible to avoid the troubles such as the so-called color fog.

In the above-described first embodiment, although at least the pressure side surface of the pressure pad 3 to be pressed toward the film 2 side is coated with the ultraviolet-curing resin 6 to improve the surface hardness and to suppress the generation of static electricity, if a material (concretely, the trade name: Seikabeam PHC-2210 (CF) manufactured by Dainichi Seika Kogyo Co., Ltd.) additionally having a conductivity is used as the ultraviolet-curing resin 6, it is possible to more effectively prevent the generation of static electricity due to the sliding between the film 2 and the pressure pad 3.

Furthermore, the configuration of the pressure pad is not limited to the configuration in the first embodiment but the pressure pad can employ different configurations.

Figure 3:
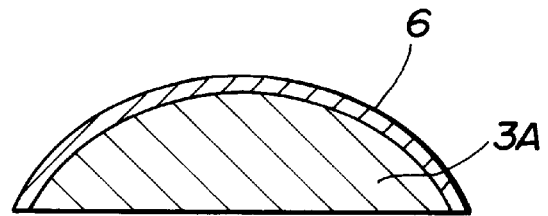
FIG. 3 is an enlarged cross-sectional view of a principal portion, showing a modification of the pressure pad in the magnetic recording apparatus of the camera according to the first embodiment of this invention.

FIG. 3 is an illustration of a modification of the first embodiment of this invention, and is an enlarged cross-sectional view of a principal portion, showing only a pressure pad of a magnetic recording apparatus for use in cameras. This modification relates to the change of only the configuration of the pressure pad of the magnetic recording apparatus according to the first embodiment. Accordingly, the other components are the same as those in the first embodiment, and the illustration thereof is omitted because of referring to FIG. 1.

As shown in FIG. 3, the cross-sectional configuration of a pressure pad 3A according to this modification is an arc configuration, and the top portion of this arc configuration is pressed against the magnetic head side in a state a film is interposed therebetween. Whereupon, a magnetic recording section of the film can certainly be pressed against a magnetic gap portion defined in the top portion of a magnetic head with an arc configuration.

Furthermore, as in the case of the above-described first embodiment, at least the pressure side surface of the pressure pad 3A to be pressed against the film surface is coated with a material, such as an ultraviolet-curing resin 6, capable of improving the surface hardness and of suppressing the generation of static electricity. The ultraviolet-curing resin 6 has a conductivity. In addition, the surface hardness of the ultraviolet-curing resin 6 is similarly set so that the pencil scratch value above 2H under a test method according to the JIS K5400 standard.

The pressure pad 3A of the magnetic recording apparatus according to the modification of the first embodiment thus constructed can offer the same effects as those of the first embodiment.

Figure 4:
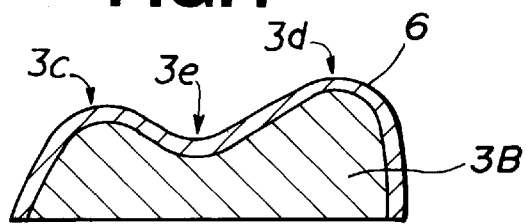
FIG. 4 is an enlarged cross-sectional view of a principal portion, showing another modification of the pressure pad in the magnetic recording apparatus of the camera according to the first embodiment of this invention.

FIG. 4 is an illustration of a different modification of the first embodiment of this invention, and is an enlarged cross-sectional view showing only a pressure pad of a magnetic recording apparatus in a camera. The difference of this different modification from the first embodiment is only the configuration of the pressure pad. For this reason, the other components are the same as those in the first embodiment, and hence the illustration thereof is omitted because of referring to FIG. 1.

As shown in FIG. 4, the cross-sectional configuration of a pressure pad 3B according to this different modification has two consecutive high portions 3c, 3c different in height from each other, that is, is the so-called semi-guitar-like configuration, and a film 2 travels from the lower-height high portion of the two high portions to the higher-height high portion thereof.

Furthermore, as in the case of the above-described first embodiment, at least the pressure side surface of the pressure pad 3B to be pressed against the film surface is coated with a material, such as an ultraviolet-curing resin 6, capable of improving the surface hardness and of suppressing the generation of static electricity. The ultraviolet-curing resin 6 has a conductivity. In addition, the surface hardness of the ultraviolet-curing resin 6 is similarly set so that the pencil scratch value assumes above 2H under a test method according to the JIS K5400 standard.

The pressure pad 3B of the magnetic recording apparatus according to the modification of the first embodiment thus constructed can offer the same effects as those of the first embodiment, and in addition to these effects, since the cross-sectional configuration of the pressure pad 3B takes the so-called semi-guitar-like configuration, the higher height high portion of the two high portions takes the contact state with a magnetic head, and therefore, when a film is loaded and fed along the film traveling passage, the tip portion of the film easily gets between the magnetic head and the pressure pad. Consequently, smooth film feeding becomes feasible.

Figure 5:
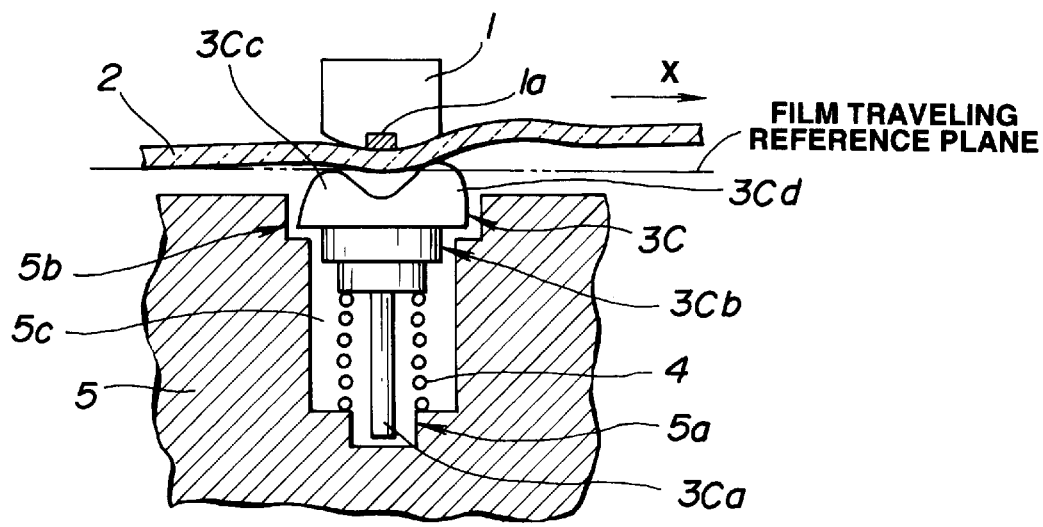
FIG. 5 is a schematic illustration of a structure of a magnetic recording mechanism for use in a camera employing a film with a magnetic recording section according to a second embodiment of the present invention.
Figure 6:
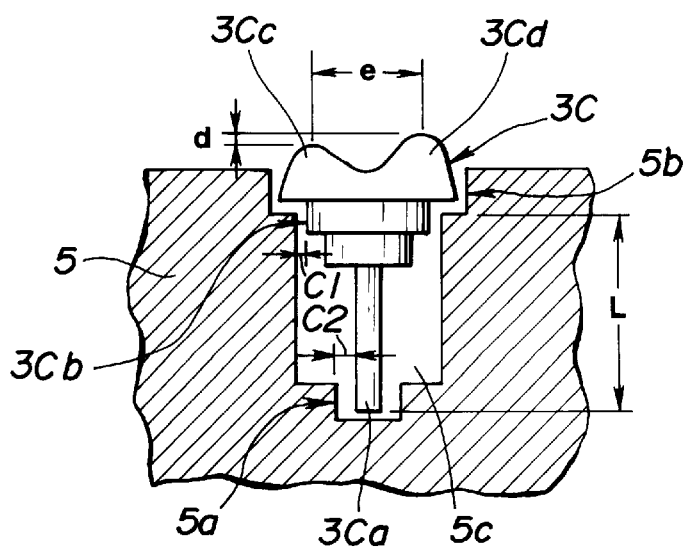
FIG. 6 is a schematic illustration of a state of fitting a pressing member in the magnetic recording mechanism of the camera in FIG. 5.

FIG. 5 is a schematic illustration of the vicinity of a magnetic recording mechanism of a camera employing a film with a magnetic recording section according to a second embodiment of the present invention, and FIG. 6 is a schematic illustration of the attachment of a pressing member in this magnetic recording mechanism. Incidentally, this magnetic recording mechanism for a camera according to the second embodiment employs the so-called swinging type pressing member.

As shown in FIG. 5, the camera magnetic recording mechanism according to the second embodiment is composed of a magnetic head 1 with a magnetic gap portion 1a for the magnetic recording and reading of information, a pressure pad 3C serving as a pressing member for pressing a magnetic recording section of a film 2 against the magnetic head 1, a biasing member 4 comprising a coil spring or the like serving as biasing means for biasing or urging the pressure pad 3C toward the magnetic head 1 side, and others, which are housed within a camera body 5. The film 2 is sandwiched between the magnetic head 1 and the pressure pad 3C. In FIG. 5, the feeding (traveling) direction of the film 2 is indicated with an arrow X.

The magnetic head 1 is fixed to a stationary member (not shown) on the rear side of the camera body 5, and the contact surface of the magnetic head 1 with the film 2 has an arc configuration whose top portion has the aforesaid magnetic gap portion 1a. Further, this magnetic gap portion 1a is disposed to face the interior of the film feeding passage in which the film 2 travels within the camera body 5, and the magnetic gap portion 1a is positioned and placed to be allowed to come into contact with the magnetic recording section of the film 2 traveling in the film feeding passage.

Furthermore, at a position being in opposed relation to the magnetic head 1 within the camera body 5, an engaging hole section 5c is made to accommodate the pressure pad 3C. A step portion 3Cb is formed at the proximal section of the pressure pad 3C, and a shaft portion 3Ca is planted in a central portion of the step portion 3Cb. To the step portion 3Cb there is fixed one end portion of the biasing member 4 comprising an extensible coil spring or the like wound around the shaft portion 3Ca. The other end portion of the biasing member 4 is placed into contact with the bottom 5a of the engaging hole section 5c. Whereupon, the pressure pad 3C undergoes the biasing by the biasing force of the biasing member 4 toward the magnetic head 1 side.

The aforesaid engaging hole section 5c has, at its upper portion, a large-diameter step portion 5b for supporting the head portion of the pressure pad 3C while having a small-diameter recess portion 5a for accepting the tip portion of the shaft portion 3Ca. The tip portion of the shaft portion 3Ca engages with the recess portion 5a while the step portion 3Cb engages with the engaging hole section 5c. Whereupon, the pressure pad 3C is always set at a position facing the magnetic gap portion 1a of the magnetic head 1.

In addition, the pressure pad 3C has a surface facing the magnetic gap 1a of the magnetic head 1 which incorporates two high (projecting) portions 3Cc, 3Cd different in height from each other, with the two high portions 3Cc, 3Cd defining a substantially U-shaped low portion therebetween. That is, in the cross-sectional configuration of the pressure pad 3C, the two high portions 3Cc, 3Cd being projections different in height from each other are consecutively formed on its magnetic head facing surface (film contact surface), thus taking a so-called semi-guitar-like configuration.

The downstream side high portion 3Cd in the film 2 feeding direction X is made to further protrude toward the magnetic head 1 side than the upstream side high portion 3Cc. In other words, the film 2 is made to travel from the lower-height high portion 3Cc side of the two high portions 3Cc, 3Cd to the higher-height high portion 3Cd thereof.

Therefore, when the pressure pad 3C is pressed by the biasing force of the biasing member 4 toward the magnetic head 1 side in a state where the film 2 is put therebetween, the U-shaped portion (low portion) defined between the aforesaid two high portions 3Cc, 3Cd is brought into contact with the arc configuration of the magnetic head 1 in a state where the film 2 is interposed therebetween, with the result that the positioning of the pressure pad 3C is made in the film feeding direction.

The difference d between the projecting amounts of the two high portions 3Cc, 3Cd of the pressure pad 3C is, as shown in FIG. 6, determined on the basis of the relation of factors including:

the length from the large-diameter step portion 5b of the engaging hole section 5c to the tip portion of the shaft portion 3Ca=L;

the distance between the top portions of the two high portions 3Cc, 3Cd of the pressure pad 3C=e;

the engagement looseness (i.e. "gap") C1 between the step portion 3Cb of the pressure pad 3C and the engaging hole section 5c; and the engagement looseness (i.e. "gap") C2 between the tip portion of the shaft portion 3Ca of the pressure pad 3C and the inner wall surface of the recess portion 5a of the engaging hole section 5c.

Figure 7:
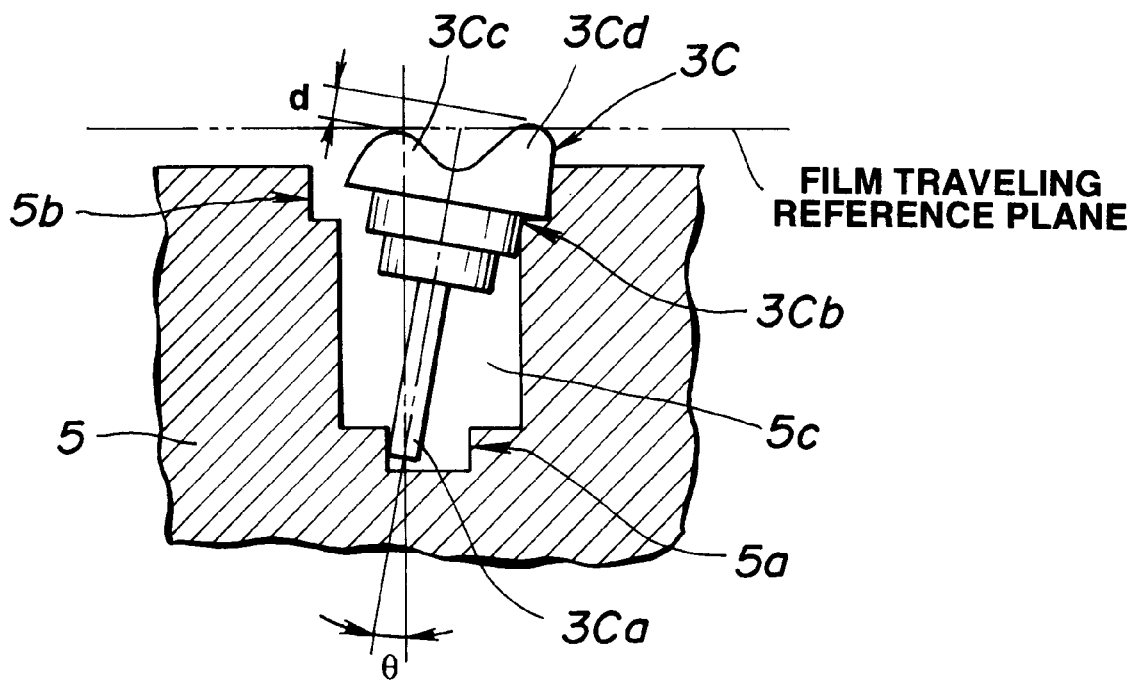
FIG. 7 is an illustration showing a state in which a pressure pad in the magnetic recording mechanism of the camera in FIG. 5 is inclined to the utmost limit within the camera, which is useful for explaining the protruding quantity of the pressure pad.

FIG. 7 shows the state to be taken when assuming that in the camera magnetic recording mechanism according to the second embodiment the pressure pad 3C is inclined to the utmost limit (inclination angle=θ(max)) due to the aforesaid looseness C1, C2 (see FIG. 6).

In this case, the projection difference d is set so that the downstream side high portion 3Cd of the pressure pad 3C does not become lower than the upstream side high portion 3Cc with respect to a film traveling reference plane (see FIG. 7). Further, the relationship between the projection difference d and the aforesaid factors L, e, C1 and C2 is expressed by the following equation (1).

$$d \approx ((C1+C2) \, H \, e)/L \tag{1}$$

In this case, the allowable dimensional error of the projection difference d is set to approximately 0.02 mm.

Figure 8:
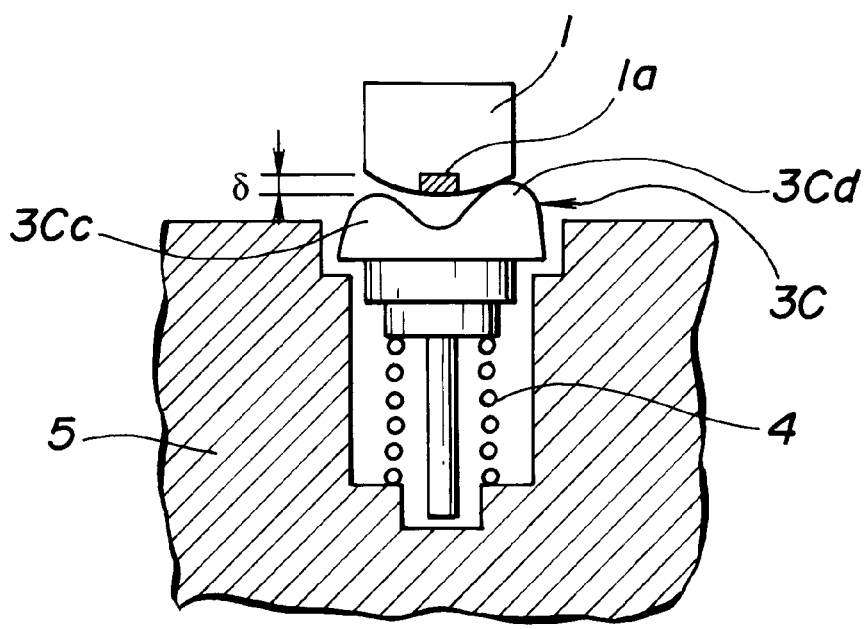
FIG. 8 is an illustration useful for describing an operation of the magnetic recording mechanism in a state where a film is not loaded in the camera of FIG. 5.

Furthermore, in a state where the film 2 is not loaded in the camera, the pressure pad 3C is pressed toward the magnetic head 1 side by the biasing force of the biasing member 4, and hence, the pressure pad 3C and the magnetic head 1 are in contact condition with each other, and in this contact state, since, as mentioned above, the contact surface of the magnetic head 1 with the film 2 has the arc configuration and the contact surface of the pressure pad 3 with the film 2 has the semi-guitar-like configuration and further the upstream side high portion 3Cc is made to be lower than the downstream side high portion 3Cd, as shown in FIG. 8 a gap a is defined between the film contact surface of the magnetic head 1 and the high portion 3Cc of the pressure pad 3C, so that the tip portion of the film 2 can smoothly get between the magnetic head 1 and initial pressure pad 3C at the film feeding.

Referring to FIGS. 5, 6 and 7, a description will be taken hereinbelow of an operation of the magnetic recording mechanism for cameras thus constructed according to the second embodiment.

As mentioned before, for ensuring the magnetic recording and reading of information in and from the magnetic recording section of the film 2 by the magnetic gap portion 1a of the magnetic head 1, the correct contact between the magnetic gap portion 1a and the magnetic recording section is necessary.

Figure 19:
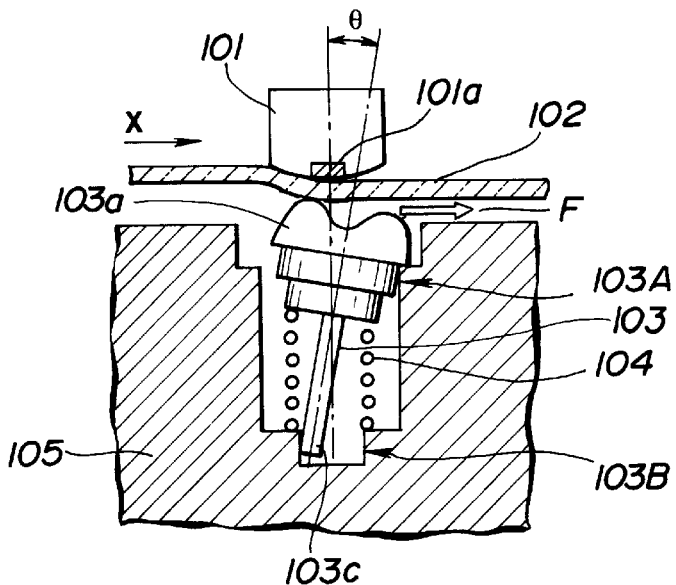
FIG. 19 is an illustration of a prior magnetic recording mechanism, employing a swinging type pressing member.
Figure 20:
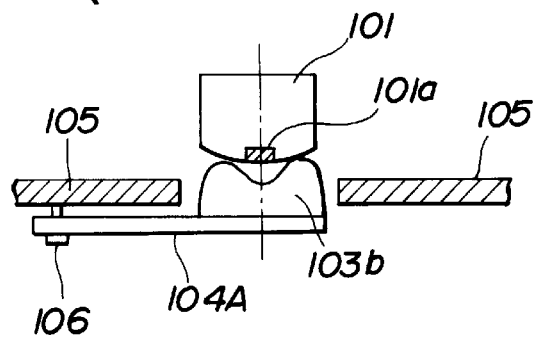
FIG. 20 shows that in a prior magnetic recording mechanism a plate spring is used as a biasing member for pushing a pressing member against the magnetic head side.
Figure 21:
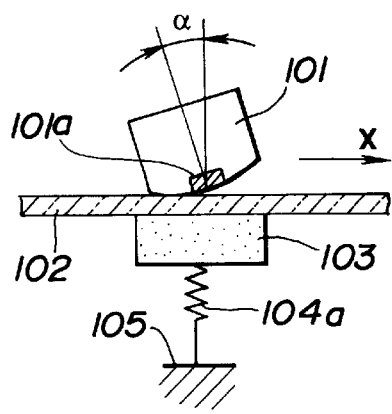
FIG. 21 shows that in the FIG. 19 prior magnetic recording mechanism a magnetic head is assembled in a state of being inclined with respect to a film surface.
Figure 22:
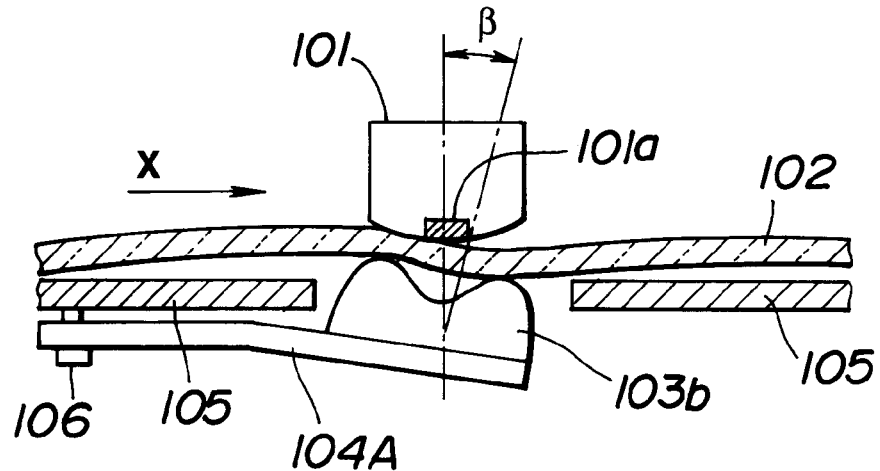
FIG. 22 illustrates the state in which in the FIG. 20 magnetic recording mechanism a pressing member is inclined with respect to a magnetic gap portion when a film is interposed between a magnetic head and a pressing member.
Figure 23:
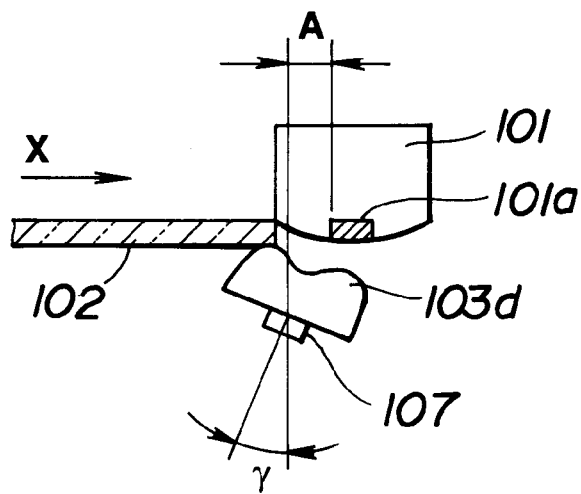
FIG. 23 illustrates a prior magnetic recording mechanism in which a magnetic gap portion and a swinging center of a pressing member are shifted from given positions at assembling.

However, in the case of employing the prior swinging type pressure pad, as described before referring to FIG. 19, owing to the frictional force (F) occurring between the pressure pad (103a) and the film (102), the pressure pad (103a) gets into the condition inclined by an angle q with the engagement looseness, and in this case, difficulty is experienced to satisfactorily assure the contact condition between the magnetic gap portion (101a) and the magnetic recording section, which makes difficult the magnetic recording and reading.

Figure 9:
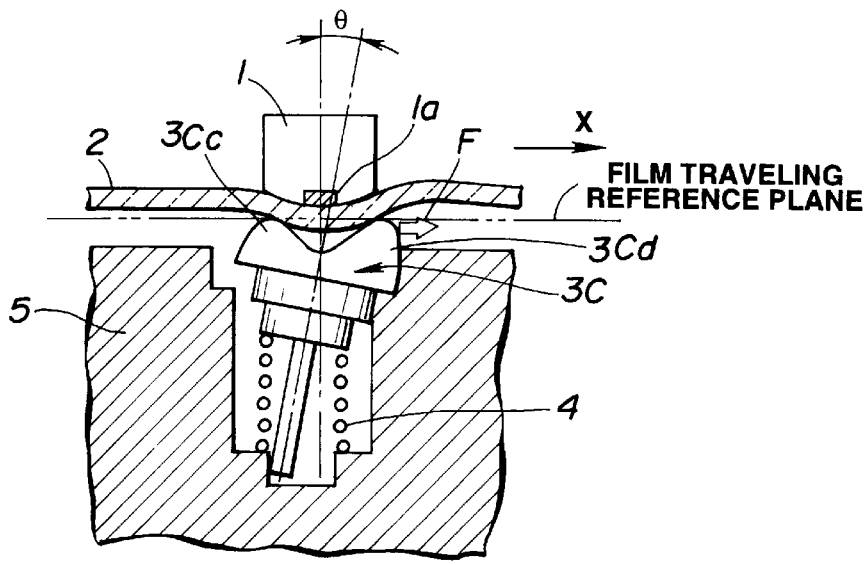
FIG. 9 is an illustration of a state of the magnetic recording mechanism of the camera in FIG. 5 in which the pressure pad swings and is inclined due to the friction with a film.

For this reason, in the second embodiment, as mentioned above, the cross-sectional configuration of the pressure pad 3C is designed to assume the semi-guitar-like configuration and the downstream side high portion 3Cd is made to be higher than the upstream side high portion 3Cc, so that, even in the case that as shown in FIG. 9 the pressure pad 3C swings due to the frictional force F generated with the film 2 to come into the condition inclined by inclination=angle q when the film 2 is loaded in the camera and the film feeding operation is conducted, the magnetic recording section of the film 2 can correctly be brought into contact with the magnetic gap portion 1a.

Furthermore, in a state where the film 2 is not loaded in the camera, since as mentioned above the pressure pad 3C is pressed against the magnetic head 1 side by means of the biasing force of the biasing member 4 and the gap d (see FIG. 8) is defined between the magnetic head 1 and the high portion 3Cc of the pressure pad 3C, the tip portion of the film 2 can smoothly get between the film contact surface of the magnetic head 1 and the high portion 3Cc of the pressure pad 3C at the film feeding.

If in this state the film 2 travels in the film feeding direction (the arrow X direction in FIG. 5), the pressure pad 3C is pushed down by the film 2 against the biasing force of the biasing member 4. Accordingly, the film 2 is put between the magnetic head 1 and the pressure pad 3C.

Furthermore, when the film feeding continues in a state where the film 2 is interposed between the magnetic head 1 and the pressure pad 3C, as shown in FIG. 9, the pressure pad 3C swings due to the frictional force F produced between the film 2 and the pressure pad 3C, thus getting into the state inclined by inclination=angle q. In this state, the position of the top portion of the downstream side high portion 3Cd becomes at least equal to or higher than the position of the top portion of the upstream side high portion 3Cc with respect to the film traveling reference plane. Accordingly, also in this case, the magnetic gap portion 1a of the magnetic head 1 can correctly be pressed against the magnetic recording section of the film 2 through the pressure pad 3C, and hence it is possible to ensure the stable magnetic recording and reading of information according to the film feeding operation.

Figure 10:
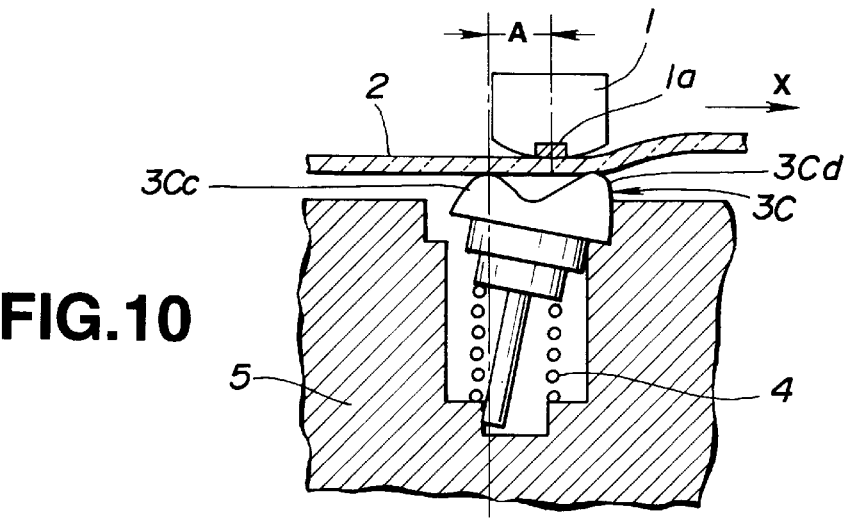
FIG. 10 is an illustration of the case that in the magnetic recording mechanism of the camera of FIG. 5 the fitting position of a magnetic head is shifted from a position facing a low portion defined by two high portions of the pressure pad due to the dimensional errors and fitting errors of components or the like at assembling.
Figure 11:
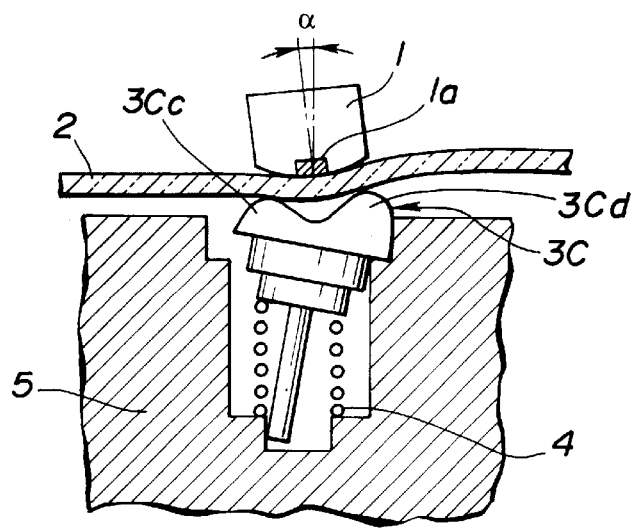
FIG. 11 is an illustration of the case that in the magnetic recording mechanism of the camera of FIG. 5 the fitting angle of the magnetic head is made due to the dimensional errors and fitting errors of components or the like at assembling.

Still further, even in cases where as shown in FIG. 10 due to the dimensional errors and fitting errors of the components or the like the fitting position of the magnetic head 1 (the magnetic gap portion 1a) is shifted by a distance indicated by character A from the position being in opposed relation to the low portion defined between the two high portions 3Cc, 3Cd of the pressure pad 3C at assembling, or in cases where as shown in FIG. 11 due to the dimensional errors and fitting errors of the components or the like the fitting of the magnetic head 1 is made in a state of being inclined by an angle α at assembling, the magnetic gap portion 1a can be maintained in the contact condition with the magnetic -recording section of the film 2, with the result that stable magnetic recording and reading are ensurable.

As described above, according to the second embodiment, the stable magnetic recording and reading are feasible without being affected by the looseness C1, C2 occurring between the pressure pad 3C and the engaging hole section 5c or the dimensional errors and fitting errors, and further the film feeding operation is smoothly and surely achievable.

In the case of the swinging type pressure pad 3C for a camera according to the second embodiment, because of being placed within the engaging hole section 5c, the light or the like coming from the exterior of the camera body 5 does not enter through gaps, whereupon it particularly has no need for light-intercepting members or the like, and it is possible to prevent the film 2 from be exposed carelessly.

Figure 12:
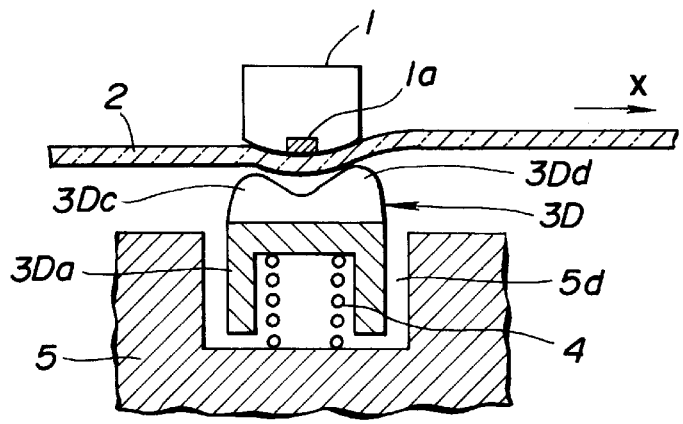
FIG. 12 is a schematic illustration of a structure of a magnetic recording mechanism for use in a camera employing a film with a magnetic recording section according to a third embodiment of the present invention.

FIG. 12 is an illustration of a third embodiment of the present invention, and is a schematic illustration of a structure of a magnetic recording mechanism in a camera employing a film with a magnetic recording section. This magnetic recording mechanism for a camera according to the third embodiment employs the so-called swinging type pressing member as in the case of the above-described second embodiment. Further, in this third embodiment, only the means for supporting the pressing member is different therefrom, and the other basic structure is the same as that of the second embodiment. Accordingly, the parts corresponding to those in the second embodiment are marked with the same reference numerals, and the description thereof will be omitted for brevity.

As shown in FIG. 12, in the magnetic recording mechanism for a camera according to this third embodiment, the film contact surface of a pressure pad 3D being a pressing member for pressing a magnetic recording section of a film 2 against a magnetic head 1 is made to have two high portions 3Dc, 3Dd like the above-described second embodiment, with the upstream side high portion 3Dc being set to be lower than the downstream side high portion 3Dd.

This pressure pad 3D is, as shown in FIG. 12, fixed onto the top surface on the upper end portion side of a bearing base 3Da made as a hollow cylindrical means whose upper end is closed and lower end is open. This bearing base 3Da is located within an engaging recess section 5d bored in a position facing the magnetic head 1 in a camera body 5. The pressure pad 3D accommodates a biasing member 4 comprising a coil spring or the like serving as a biasing means for biasing the pressure pad 3D and the bearing base 3Da toward the magnetic head 1. One end portion of this biasing member 4 is placed into contact with the inner wall ceiling surface of the bearing base 3Da while the other end portion thereof is fixedly secured to the bottom surface of the recess section 5d.

Thus, the pressure pad 3D, the bearing base 3Da and the biasing member 4 are located within the engaging recess section 5d of the camera body 5, and a slight gap (looseness) is made between the outer circumferential surface of the bearing base 3Da being a cylindrical member and the inner wall surface of the engaging recess section 5d. The size of this gap, i.e., the looseness, corresponds to the looseness C1, C2 in the above-described second embodiment. Accordingly, owing to this looseness the pressure pad 3D can swing in the film feeding direction (arrow X direction in FIG. 12) according to the feeding operation of the film 2.

The operation of the magnetic recording mechanism of a camera thus constructed according to the third embodiment is completely the same as that of the above-described second embodiment.

As described above, the third embodiment can also offer the same effects as those of the second embodiment, and additionally, the members constituting the means for supporting the pressure pad 3D are reduced, thus simplifying the magnetic recording mechanism and further reducing the manufacturing cost.

Moreover, a description will be made hereinbelow of a fourth embodiment of the present invention.

Figure 13:
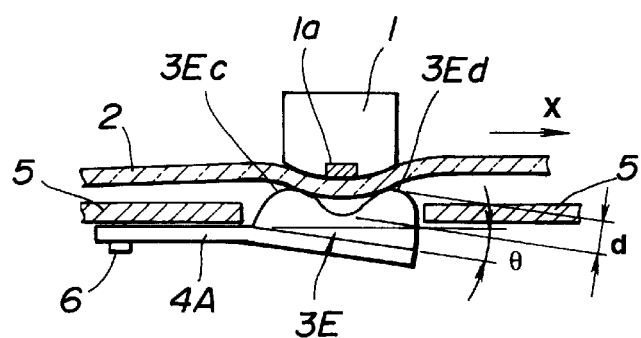
FIG. 13 is a schematic illustration of a structure of a magnetic recording mechanism for use in a camera employing a film with a magnetic recording section according to a fourth embodiment of the present invention.

FIG. 13 is a schematic illustration of only a construction of a magnetic recording mechanism for use in a camera employing a film with a magnetic recording section according to the fourth embodiment. In the magnetic recording mechanism of a camera according to the fourth embodiment, for example, a plate spring is used as the biasing force for pressing a pressing member against the magnetic head side. That is, as compared with the above-described second and third embodiments, this fourth embodiment differs in only the biasing means acting as the means for supporting the pressing member therefrom, and the other basic construction is the same as those in the second and third embodiments. Accordingly, the components corresponding to those in the second and third embodiments are marked with the same reference numerals, and the description thereof will be omitted for simplicity.

As shown in FIG. 13, as in the case of the above-described second embodiment, the magnetic recording mechanism for a camera according to the fourth embodiment comprises a magnetic head 1 with a magnetic gap portion 1a for the magnetic recording and reading of information, a pressure pad 3E being a pressing member for pressing a magnetic recording section of a film 2 against the magnetic head 1, and a biasing member 4A comprising a plate spring or the like serving as a biasing means for biasing the pressure pad 3E toward the magnetic head 1 side, which are placed within a camera body 5. The film 2 is interposed between the magnetic head 1 and the pressure pad 3E. In this case, the feeding (traveling) direction of the film 2 is the arrow X direction in FIG. 13.

The pressure pad 3E is placed on the free end portion of the plate spring 4A being the biasing member whose proximal portion is cantilevered by a supporting pin 6, and the film contact surface of the pressure pad 3E is disposed to face the magnetic gap portion 1a side of the magnetic head 1 in a state where the film 2 is interposed therebetween. Whereupon, the pressure pad 3E is biased to the magnetic gap portion 1a of the magnetic head 1 by means of the biasing force of the biasing member 4A.

Furthermore, as well as the above-described second embodiment, the film contact surface of the pressure pad 3E has two high portions 3Ec, 3Ed, and of the two high portions 3Ec, 3Ed, the downstream side high portion 3Ed in the film feeding direction X is projected further toward the magnetic head 1 side than the upstream side high portion 3Ec. In addition, when the film 2 is put between the magnetic head 1 and the pressure pad 3E, the pressure pad 3E is pushed downwardly by a distance corresponding to the thickness of the film 2 against the biasing force of the biasing member 4A so that the pressure pad 3E is inclined by an angle q. The difference d between the projections of both the high portions 3Ec, 3Ed is set so that at this time the downstream side high portion 3Ed does not become lower than the upstream side high portion 3Ec.

A brief description will be made hereinbelow of an operation of the camera magnetic recording mechanism according to the fourth embodiment thus constructed.

Figure 14:
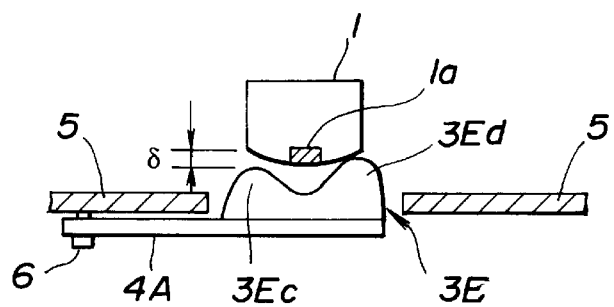
FIG. 14 is an illustration of the magnetic recording mechanism in a state in which a film is not loaded in the FIG. 13 camera.

As shown in FIG. 14, in a state where the film 2 (not shown in FIG. 14) is not loaded in the camera, as well as the above-described second embodiment, the pressure pad 3E is pressed toward the magnetic head 1 side through the biasing force of the biasing member 4A, and therefore the pressure pad 3E and the magnetic head 1 are in the contact condition. On the other hand, if the film 2 is mounted in the camera and fed therein, the tip portion of the film 2 can get in the gap d between the film contact surface of the magnetic head 1 and the high portion 3Ec of the pressure pad 3E.

In this state, if the film 2 is further delivered in the film feeding direction X, due to the film 2 the pressure pad 3E is pushed downwardly against the biasing force of the biasing member 4A. Whereupon, the pressure pad 3E gets into the condition inclined by inclination=angle q (see FIG. 13), while the film 2 is sandwiched between the magnetic head 1 and the pressure pad 3E.

Even in this state, since the two high portions 3Ec, 3Ed of the pressure pad 3E are formed so that the downstream side high portion 3Ed protrudes further the magnetic head 1 side by the projection difference d with respect to the upstream side high portion 3Ec, the magnetic gap portion 1a of the magnetic head 1 can appropriately be pressed against the magnetic recording section of the film 2 by the pressure pad 3E. Consequently, it is possible to surely perform the magnetic recording and reading of information during the film feeding operation.

Figure 15:
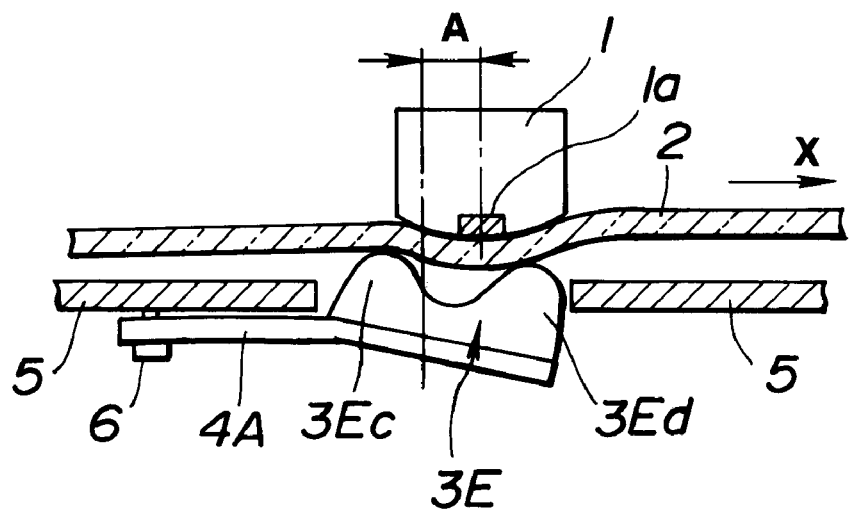
FIG. 15 is an illustration of the case that in the magnetic recording mechanism of the camera of FIG. 13 the fitting position of a magnetic head is shifted from a position facing a low portion defined by two high portions of the pressure pad due to the dimensional errors and fitting errors of components or the like at assembling.
Figure 16:
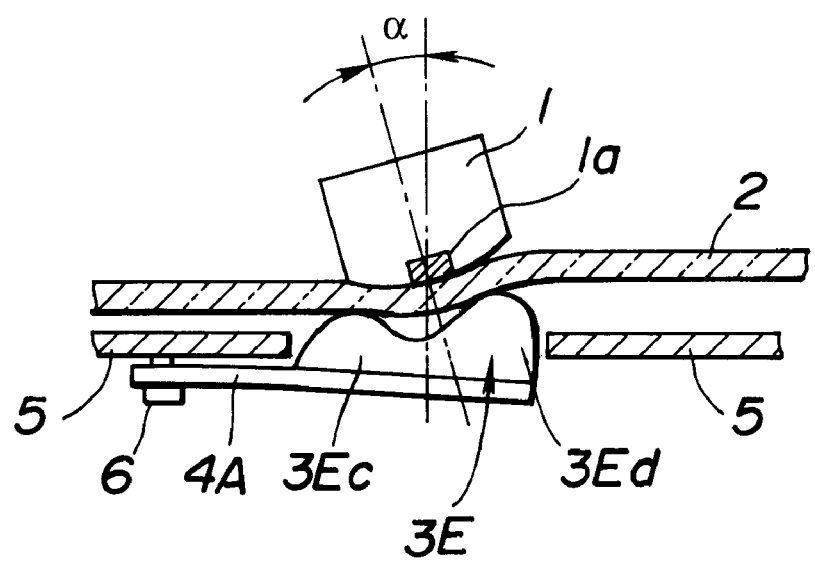
FIG. 16 is an illustration of the case that in the magnetic recording mechanism of the camera of FIG. 13 the fitting angle of the magnetic head is made due to the dimensional errors and fitting errors of components or the like at assembling.
Figure 17:
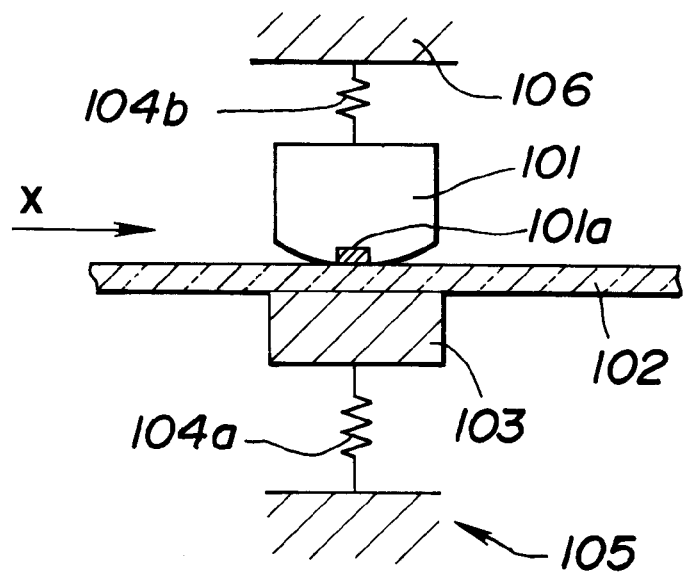
FIG. 17 is a schematic illustration of a structure of a magnetic recording apparatus applied to a prior camera.
Figure 18:
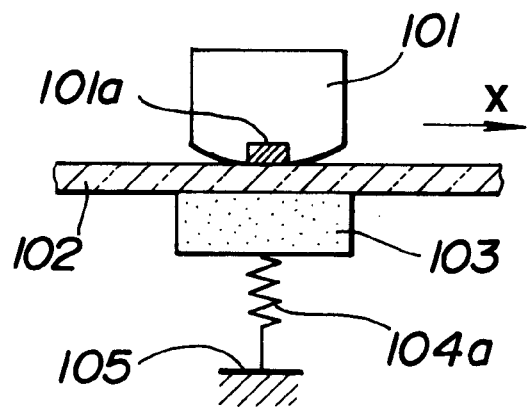
FIG. 18 is a schematic illustration of disposition of a magnetic head and a pressing member in a prior magnetic recording mechanism.

Furthermore, even in cases where as shown in FIG. 15 due to the dimensional errors and fitting errors of the components or the like the fitting position of the magnetic head 1 (the magnetic gap portion 1a) is shifted by a distance indicated by character A from the position being in opposed relation to the U-shaped portion (low portion) defined between the two high portions 3Ec, 3Ed of the pressure pad 3C at assembling, or in cases where as shown in FIG. 16 due to the dimensional errors and fitting errors of the components or the like the fitting of the magnetic head 1 is made in a state of being inclined by an angle α at assembling, the magnetic gap portion 1a can correctly be maintained in the contact condition with the magnetic recording section of the film 2, with the result that the stable magnetic recording and reading are ensurable.

As described above, according to the above-described fourth embodiment, even the magnetic recording mechanism employing the plate spring as the biasing means for pressing the pressure pad 3E against the magnetic head 1 side can provide the same effects as those of the above-described first embodiment, and further, as compared with employing the swinging type pressing member, the mechanism becomes more simplified.

It should be understood that different embodiments in wide range can obviously be made on the basis of this invention without departures from the spirit and scope of the invention. This invention is not be limited to specific embodiments but limited only by the accompanying claims.

What is claimed is:

1. A camera employing a film with a magnetic recording section and comprising:

a magnetic head having a magnetic gap portion for magnetically recording and/or reading (reproducing) information; and a pressing member for pressing a surface of said film against said magnetic head, said pressing member having a film contact surface side cross section in a film traveling direction of a substantially U-like configuration, and two high portions protrusively defined on both sides of said U-like configuration which are different in protruding length from each other.

2. A camera employing a film with a magnetic recording section and comprising:

a magnetic head having a magnetic gap portion for magnetically recording or reading (reproducing) information; and a pressing member for pressing a surface of said film against said magnetic head, said pressing member having a first high portion for engaging said film on an upstream side of a film feeding direction during magnetic recording or reading by said magnetic gap portion and a second high portion for engaging said film on a downstream side of the same film feeding direction, with said downstream side high portion being formed to protrude toward the magnetic head side by an amount greater than said upstream side high portion.

3. A camera employing a film with a magnetic recording section, said camera comprising:

a magnetic head having a magnetic gap portion which is brought into contact with a surface of said film for magnetically recording or reading (reproducing) information;

a pressing member for pressing said magnetic recording section of said film against the magnetic head side; and biasing means for biasing said pressing member toward the magnetic head side, wherein said pressing member has two high portions on opposite sides of said magnetic gap portion, said two high portions separated by a low portion and engaging a surface of said film, and a film contact surface cross-section of said pressing member having a substantially U-like configuration, and said two high portions are different in protruding length from each other.

4. A camera as defined in claim 3, further comprising supporting means for supporting said pressing member so that said pressing member is movable in a film traveling direction.

5. A camera as defined in claim 3, further comprising supporting means for supporting said pressing member so that said pressing member is swingable in a film traveling direction.

6. A camera as defined in claim 3, further comprising supporting means for supporting said pressing member so that said pressing member is movable in a direction substantially perpendicular to a film traveling direction.

7. A camera as defined in claim 2 or 3, wherein, in a state where film lies between said magnetic head and said pressing member, said pressing member is made so that said high portion on the downstream side in a film feeding direction is brought into contact with said magnetic gap portion at the magnetic recording or reading, while said upstream side height portion is separated from said magnetic head.

8. A camera as defined in claim 7, wherein a gap defined by the separation between said upstream side high portion and said magnetic head is set to a given quantity whereby a tip portion of said film fed at film loading setting easily moves between said magnetic head and said pressing member.

9. A camera as defined in claim 2 or 3, wherein, when said film is moved in a film feeding direction, said pressing member is made so that said downstream side high portion takes the same position as or protrudes by an amount greater than said upstream side high portion with respect to a film feeding reference plane during magnetic recording or reading by said magnetic gap portion.

10. A camera as defined in claim 2 or 3, wherein at least a film pressure side surface of said pressing member is coated with a material having at least one of a function for improving a surface hardness of said pressing member and a function for suppressing generation of static electricity.

11. A camera employing a film with a magnetic recording section, said camera comprising:

a magnetic head having a magnetic gap portion which is brought into contact with a surface of said film for magnetically recording or reading (reproducing) information; and a pressing member for pressing said magnetic recording section of said film against said magnetic head, wherein at least a film pressure side surface of said pressing member to be placed into contact with said film is coated with a material for improving a surface hardness of said pressing member and for suppressing generation of static electricity.

12. A camera according to claim 11 wherein said coating material is conductive.

13. A camera employing a film with a magnetic recording section, said camera comprising:

a magnetic head having a magnetic gap portion which is brought into contact with a surface of said film to magnetically recording or reading (reproducing) information; and a pressing member for pressing said magnetic recording section of said film against said magnetic head, wherein at least a film pressure side surface of said pressing member to be placed into contact with said film is coated with an ultraviolet-curing resin.

14. A camera as defined in claim 13, wherein said coating ultraviolet-curing resin has a conductivity.

* * * * *

UNITED STATES PATENT AND TRADEMARK OFFICE
CERTIFICATE OF CORRECTION

PATENT NO. : 5,920,738
DATED : July 6, 1999
INVENTOR(S) : Hideyuki Kasahara; Tokuo Shimizu and Turo Komatsu It is certified that error appears in the above-identified patent and that said Letters Patent is hereby corrected as shown below:

Column 2,
Line 17, delete "afore said" and insert -- aforesaid --.

Column 6,
Line 30, after "supressing" add -- : --.
Line 31, delete "," and insert -- ; --.

Column 11,
Line 33, after "value" insert -- is --.

Column 14,
Line 2, delete "a" and insert -- d --.

Column 17,
Line 29, after "further" insert -- toward --.
Line 34, delete "the".
Line 63, delete "is" and insert -- should therefore --.

Signed and Sealed this

Twenty-fourth Day of July, 2001

*Attest:*

Nicholas P. Godici

*Attesting Officer*

NICHOLAS P. GODICI
*Acting Director of the United States Patent and Trademark Office*